United States Patent [19]

Van Buren

[11] Patent Number: 4,719,506
[45] Date of Patent: Jan. 12, 1988

[54] METHOD FOR PREDICTABLY DETERMINING HALFTONE DOT SIZES WHEN ALTERING COLOR IN A COLOR SEPARATION PROCESS PRIOR TO SCANNING

[76] Inventor: Keith E. Van Buren, 24832 W. Lake Shore Dr., Round Lake, Ill. 60073

[21] Appl. No.: 859,656

[22] Filed: May 5, 1986

Related U.S. Application Data

[63] Continuation-in-part of Ser. No. 537,984, Sep. 30, 1983, abandoned.

[51] Int. Cl.[4] ............................ G03F 3/08; G03F 3/10
[52] U.S. Cl. ......................................... 358/80; 358/76
[58] Field of Search ................................... 358/76, 80

[56] References Cited

U.S. PATENT DOCUMENTS

| | | | |
|---|---|---|---|
| 4,200,365 | 4/1980 | Keondjian et al. | 353/29 |
| 4,310,848 | 1/1982 | Carter et al. | 358/76 |
| 4,583,186 | 4/1986 | Davis et al. | 358/76 |

OTHER PUBLICATIONS

*Crosfield Magnascan 625/635 E/M Operator's Manual,* Issue 01, Crosfield Electronics, Ltd., London, England, date unknown.

*Primary Examiner*—James J. Groody
*Assistant Examiner*—Randall S. Svihla
*Attorney, Agent, or Firm*—Michael D. McCully

[57] ABSTRACT

A process for color correcting an original color transparency in making individual plates for color printing comprises the steps of directing light through the transparency, adjusting the relative color densities of the primary color components (yellow, magenta and cyan) in the light to provide a desired color balance in the overall appearance of the transparency, determining the individual color densities of the primary color components at that desired color balance, determining the amounts of correction to the yellow, magenta and cyan dot percentages (dot sizes) in order to compensate for contamination of one or more colors in each of the three primary colors of printing inks, and scanning the color transparency. When the transparency is scanned, the individual color densities are initially electronically adjusted to respective amounts that are proportional to respective intensities of the primary components of the adjusted light through the transparency, and then are secondarily electronically adjusted by amounts that are proportional to respective amounts of correction to yellow, magenta and cyan dot percentages attributable to printing ink contamination. Scanning then generates yellow, magenta and black halftone separation films, which are corrected to compensate for printing ink contamination, for making four-color printing plates. Apparatus for carrying out the process includes a transparency viewer having the capability of varying the individual color densities, in combination with a scanner or digital imaging device for generating color halftone separation films.

6 Claims, 10 Drawing Figures

METHOD FOR PREDICTABLY DETERMINING HALFTONE DOT SIZES WHEN ALTERING COLOR IN A COLOR SEPARATION PROCESS PRIOR TO SCANNING

This is a continuation-in-part application of U.S. patent application Ser. No. 537,984, filed Sept. 30, 1983, now abandoned.

BACKGROUND OF THE INVENTION

1. Field:

This invention relates to color printing, and particularly to the process known in the printing arts as color separation in which an original color transparency is used to generate individual halftone separation films (one separation film for each primary color component—yellow, magenta and cyan—and one separation film for black). The halftone color separation films are then used for making printing plates.

2. State of the Art:

Full color printing successively applying primary colored inks —yellow, magenta and cyan—to a sheet from separate halftone printing plates, one plate for each primary color component and one plate for black, in a manner to extend the tone scale and enhance shadow detail. Printed pictures typically start as continuous tone copy, such as photographs, paintings or the like. These must be converted into a dot pattern before they can be printed. The dots vary in size so that the viewer sees them as various tones or shades of the color being printed. If the dots on a printed picture are relatively small, occupying 25% or less of the space in which they are printed, they represent highlight areas. If they are heavy, occupying about 70% or more of the space, they represent shadow areas. In the midtone areas the printed dots occupy 25% to 70% of the space. When a continuous tone copy has been converted into a dot pattern it is called a halftone.

To print a color picture from a color transparency, separate halftone color plates must first be made. This involves the above-mentioned color separation procedure in an electronic color scanner or a digital imaging device. In the scanning process, the original color transparency is mounted on a rotatable transparent analyze drum. Light is directed through the transparency to color sensors which analyze the individual primary color components (yellow, magenta and cyan) and transmit this information electronically to a laser exposure which exposes a halftone dot pattern or a piece of unexposed film mounted on an expose drum. This process produces individual halftone films, one of each of the yellow, magenta and cyan primary colors in the original transparency. A fourth halftone film is also prepared, representing the black component in the original, and a corresponding fourth plate is made from it.

Some original color tranparencies may require an increase or a decrease in one or more color components to achieve a desired color balance, or some special effect. For example, the color densities of the yellow and magenta components may be adjusted for natural flesh tones. This is accomplished by varying the color density (dot size) of the individual color plates involved. For example, if a face is too red, the scanner can be adjusted to reduce the color density of the magenta halftone film, that is, make it with smaller dots. In conventional practice, this is a matter of guesswork, and if it turns out to be wrong, it has to be re-done. Another complication is the probability that changing one color halftone film will require another to be changed. This practice of completely re-making one or more individual color halftone separation films and their corresponding plates is time consuming and costly.

SUMMARY OF THE INVENTION

It is a general object of the present invention to provide an improved process for making color halftone separation films from an original color transparency, which process is quicker and more economical than conventional processes, and which provides a predictable, desired color balance without guesswork.

Another object is to provide a process for viewing an original color transparency and correcting or revising the color balance thereof before the actual color separation stage in order to avoid the tedious, time-consuming and expensive trial and error procedure conventionally used.

Another object is to provide a process for color-separating an original color transparency to make individual primary color halftone separation films with certain color components changed from the original in order to provide a desired or special color balance which is different from the color relationship in the original transparency.

Another object is to provide a process for viewing an original color transparency in transmitted light, modifying the primary color components of that light to obtain a desired or special color balance in the transparency as viewed, determining the color densities of the primary light color components so modified when the desired color balance is achieved, and then using the values of the modified color components of the light to make separate color halftone films for each of the primary color components viewed in the original transparency.

In accordance with the present invention, a method for predictably determining halftone dot sizes when altering color balance in the color separating process is disclosed. This method comprises the following steps: (1) determine the relative intensities of yellow, magenta and cyan light components passing through a transparency when the transparency is shown in a desired color balance; (2) determine the proper dot percentages (dot sizes) for each color of printing ink—yellow, magenta, cyan and black—in accordance with the specific relationships between yellow, magenta and cyan light intensities and yellow, magenta, cyan and black printing ink dot percentages; (3) determine the amount of correction to yellow, magenta, cyan and black printing ink dot percentages in order to compensate for contaminations of one or more colors in each of the three primary colors of printing inks—yellow, magenta and cyan; and (4) generate separate yellow, magenta, cyan and black halftone separation films in accordance with the adjusted dot percentages for each color, corrected to compensate for printing ink contamination.

BRIEF DESCRIPTION OF THE DRAWINGS

Other objects and advantages will be apparent from the following description taken in conjunction with the accompanying drawings in which.

DESCRIPTION OF THE PREFERRED EMBODIMENT

Figure 1:
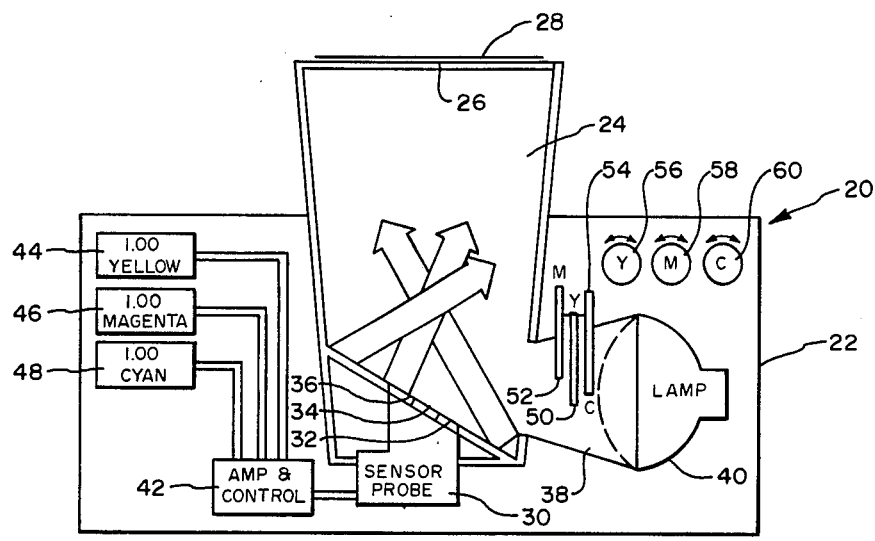
FIG. 1 is a schematic representation of a variable color transparency viewer developed for use in carrying out initial steps of the color separating process of the present invention.
Figure 1A:
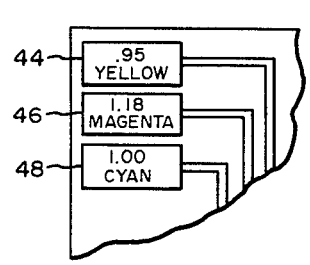
FIG. 1A is a fragmentary view of FIG. 1 after a color adjustment has been made.

Referring now to the drawings, a variable color transparency viewer, generally designated at 20, is shown in FIG. 1. This includes a housing 22 having a light mixing chamber 24 with a translucent glass plate 26 comprising a viewing light table on which an original color transparency 28 can be supported for examination. A sensor probe 30 including three or more gallium arsenide photodetectors 32, 34, 36 extends into the mixing chamber and is tuned to sense the presence and respective color densities of yellow, magenta and cyan primary color components in a white light beam 38 from a quartz-halogen dichroic-reflector lamp 40. Color signals from sensor probe 30 are transmitted through an amplifier and control unit 42 connected to individual yellow, magenta and cyan digital readouts 44, 46 and 48 which are calibrated to display relative color densities and the relationship between the primary color components sensed by the probe 30.

Individual yellow, magenta and cyan dichroic filters 50, 52, 54, respectively, are positioned to intersect the light beam 38. The filters are selectively movable by respective control knobs 56, 58, 60 through cams or the like (not shown) to vary the color densities of the primary light components in the mixing chamber. The adjustable filters and color density readouts, and the electronic controls therefor, are commercially available.

Figure 2:
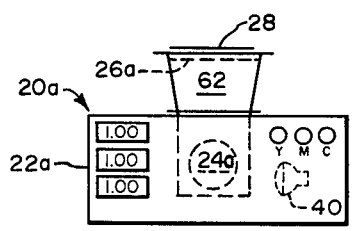
FIG. 2 is a view similar to FIG. 1 showing an alternative embodiment of the variable color transparency viewer.

Alternatively, as shown in FIG. 2, a similar transparency viewer 20a may have a mixing chamber 24a terminating at the top of the housing 22a, and a separate extension 62 of suitable height with a translucent glass viewing plate 26a in the top end of the mixing chamber. This provides a somewhat more compact unit for portability, as for viewing at a customer's premises, and enables more flexibility in the size and shape of a color transparency being viewed.

Figure 3A:
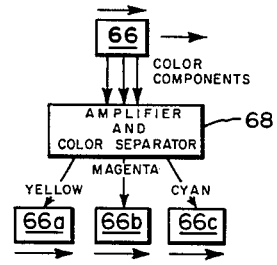
FIG. 3A is a schematic diagram showing the color separation process whereby color signals read by a scanning head are transmitted to individual expose heads.
Figure 3:
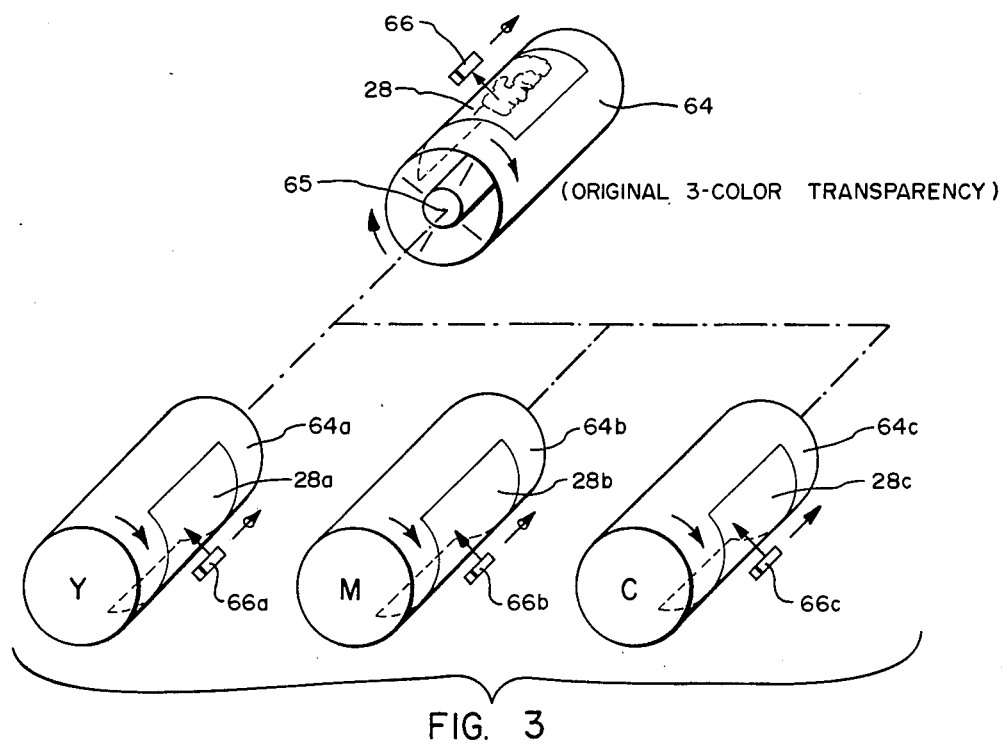
FIG. 3 is a schematic view of a color scanner and separator used in practicing later steps of the process of the present invention.

In addition to the previous transparency viewer 20 or 20a, a scanner and color separator apparatus, as schematically shown in FIG. 3, will facilitate practicing the method of the present invention. Such an apparatus is available from a number of sources, and in a wide variety, depending on the speed, capacity and special features required. In general, all such scanners and color separators have components comparable to a transparent analyzing drum 64, having an internal light source 65, and expose drums 64a, 64b, 64c for the primary color components yellow, magenta and cyan. A fourth drum is provided for a black component. For purposes of explanation, three separate expose drums are shown in FIG. 3 and described herein. In practice, however, the function of the three different expose drums is combined in a single expose drum having multiple exposures. Additionally, as a general practice, the analyze drum 64, and the electronics therefor, are all housed in a single cabinet; such devices are commonly referred to as color separation scanners. Alternatively, the analyze drum and appropriate electronics may be in a separate cabinet (the analyze cabinet), and the expose drum and accompanying electronics in a separate cabinet (the expose cabinet).

As shown in FIGS. 3 and 3A, the original color transparency is scanned by a scanning head 66, which moves axially along the drum as the drum rotates, and reads the color components on the original transparency mounted to the drum. As the drum rotates, a beam of light is directed from the center of the drum through the transparency and into the analyze head. In the analyze head, the primary colors are divided by the use of filters, the light signals are amplified with photo-multipliers, and are analyzed and corrected in the scanner color computer, shown schematically as an Amplifier and Color Separator 68 in FIG. 3A. After being processed, the color signals are directed to the expose heads 66a, 66b, 66c where a laser generated dot exposure unit exposes the individual halftone color separation films 28a, 28b, 28c. As indicated above, the expose drums are shown and described as three separate units for purposes of clarity, but in actual practice are separate segments of a single expose drum. Color printing plates are then made from the halftone separation films 28a, 28b, 28c by conventional procedures.

The foregoing description is of a conventional color transparency scanning apparatus; such apparatus is not claimed as the present invention, but rather is an apparatus for practicing the method of the invention.

When dealing with color transparencies, including black and white transparent gray scales, equal densities of yellow, magenta and cyan will produce neutral grays. For example, a yellow density of 0.60 superimposed with a cyan density of 0.60 will result in a green having a density of 0.60. A magenta of density 0.60 superimposed upon this green will result in a neutral (gray) color having a density of 0.60. This would be read on a black and white densitometer as a 0.60 gray density.

The printing process differs. In order to achieve a neutral gray from printing, a larger cyan printing dot must be used in relation to the yellow and magenta dots. Equal size printing dots in the three primary colors—yellow, magenta, cyan—will not result in a neutral gray.

In the graphic arts industry, curves or graphs are generated that represent the relationship between color densities and dot percentages (dot sizes). These are called color reproduction curves. Modern color scanners have the capability of altering these reproduction curves. These alterations can be made to adjust all color curves together (maintaining gray balance) in order to enhance highlight, midtone or shadow areas of the picture. Additionally, the scanners are capable of altering each color curve individually. The problem has been how much to alter each color curve in order to yield the desired color balance in the printed picture.

The color halftone images on the separation films 28a, 28b, 28c are all the same color, black on a white background, so there is no opportunity to observe the overall color balance until color plates are made and a proof is printed. If at this stage, the overall color balance is incorrect, as for instance the flesh tones are off, or some special color emphasis has not been properly done, much of the work up to this time has to be re-done or hand corrected (a process called dot etching).

For example, if there is insufficient yellow in a portrait to give the warm flesh tones desired, the yellow separation film 28a must be re-done, with the color density (dot size) increased. This means that the dot percentage on the yellow separation film must be increased by an appropriate increase in the light signal from the expose head 66a during the color separation process. This adjustment is conventional; therefore, details for carrying it out will not be described herein, except to state that in sophisticated scanning and separating equipment, it is simply a matter of adjusting the input dot percentage selector for the yellow color. The problem in making such an adjustment is that it has to be done by guesswork, tempered by the experience of the operator. For example, if the yellow plate is too weak, the operator may move the drum to find and evaluate yellow midtone and shadow areas in the original color transparency where the color density corresponds to a 50% and an 80% dot percentage, respectively, and will increase the color density transmitted to the yellow color expose head 66a for the subsequent run of the yellow halftone separation film. If the guess is correct, the next color proof will show a satisfactory color balance with proper flesh tones. If the guess is wrong, the yellow color must be readjusted and subsequent halftone separation films must be made until proper color balance is achieved.

The present invention changes this color balancing procedure from an art, the practice of which is limited to a small number of operators able to achieve the proper color balance after a very few number of tries, into a science, in which a person with limited instructions may practice by following a simple "by-the-numbers" procedure, which produces any desired color balance the first time, every time.

THE METHOD

In performing the method of the present invention, the variable color transparency viewer 20 or 20a, and a suitable scanner and color separation apparatus, as schematically shown in FIG. 3, are used as follows:

Step I

Rotate the filter adjustment knobs 56, 58, 60 to positions where the same color intensity of yellow, magenta and cyan components from the light beam 38 are directed into the mixing chamber 24; that is, when all three readouts 44, 46, 48 display the same numerical designation for color density. Numerals 1.00 are convenient because the intensity of primary color components in the viewer can be adjusted up or down from that point and remain in the positive range (i.e., this convention eliminates the use of negative numbers). The transparency viewer is calibrated such that one hundredth (0.01) on the color intensity scale corresponds to 0.01 color density. Therefore, the numeral 1.00 provides a convenient base from which to calculate color density variations. Further, because the problem addressed by this method is color balance, one color intensity readout may be kept at 1.00 while the necessary color balance corrections can be made to the other two. For the sake of the example that follows, cyan will be designated as a base color, and will be left unchanged, while magenta and yellow will be altered in order to effect the desired color balance. Therefore, the initial step in this procedure is to rotate the knobs 56, 58, 60 until all three readouts initially display the same color densities, for example, 1.00 each.

Step II

Place the original color transparency 28 on the viewing light table 26 (or 26a) evaluate the overall color balance. For the sake of this example, assume that it is too yellow and not red enough. By rotating knobs 56 and 58, the overall color balance appears best when the color density indication in the yellow readout 44 is 0.95, and the color density indication in the magenta readout 46 is 1.18. This meant that, in order to print a picture that has the same color balance as the adjusted or desired balance as the transparency shown on the viewer, the halftone dot size in the yellow printer should be decreased the equivalent of 0.05 density, and the halftone dot size in the magenta printer should be increased the equivalent of 0.18 density.

Step III

Figure 4:
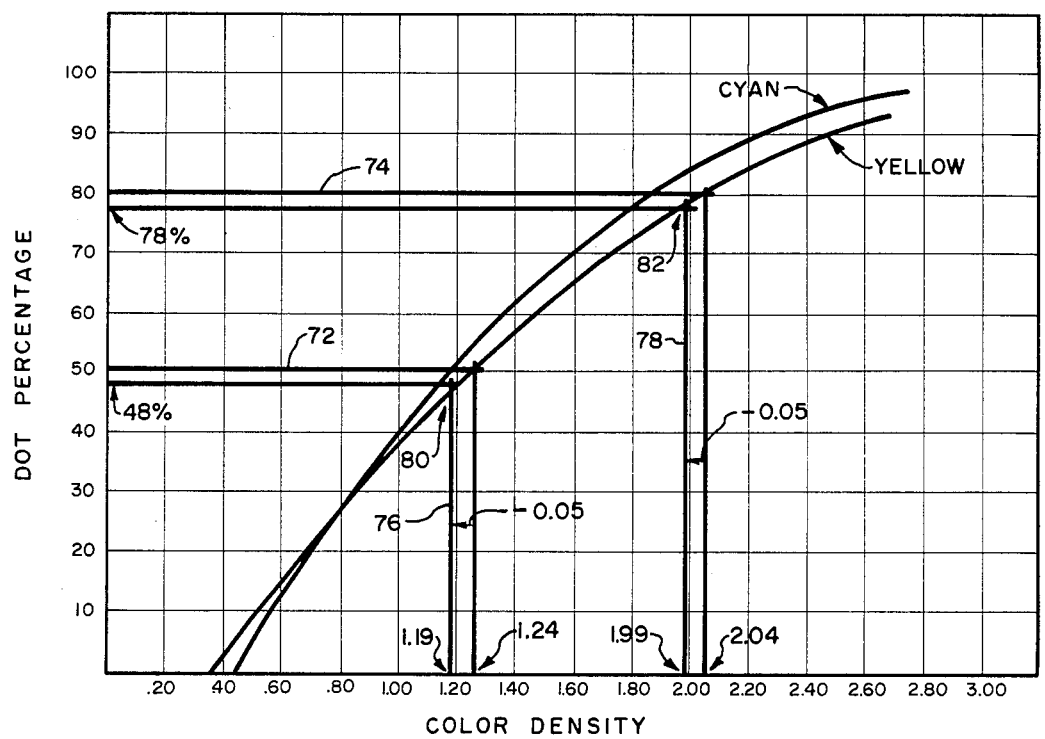
FIG. 4 is a color density graph showing the relationship between color density and halftone dot percentage for yellow and cyan primary color components.
Figure 5:
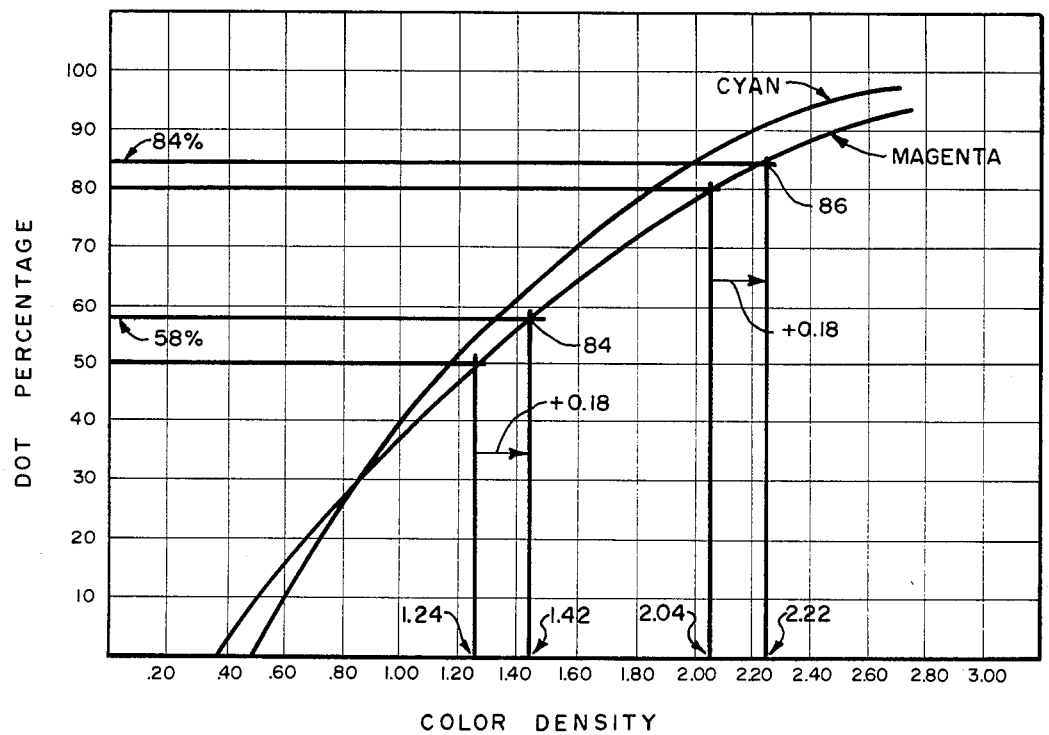
FIG. 5 is a graph similar to FIG. 4, showing the relationship between color density and halftone dot percentage for magenta and cyan primary color components.

Place the original transparency 28 on the analyze drum 64 of the scanning and color separation apparatus shown schematically in FIG. 3. Make whatever adjustment is necessary in the scanner to decrease the dot percentage (dot size) on the halftone separation film 28a in the 50% area called for by a decrease of 0.05 yellow density. Likewise, the dot size on the halftone separation film 28b should be increased in the 50% area by an amount corresponding to an increase of 0.18 magenta density. Before making color changes on such scanners, however, the precise dot percentages (dot size) must be determined. These determinations can be made from conversion charts that show the relationship of dot percentage (dot size) to color densities in each of the primary colors. FIGS. 4 and 5 show such conversion charts. They are substantially the same for yellow and magenta, but slightly different for cyan. For comparison, the curve for cyan is shown adjacent the curves for yellow and magenta in FIGS. 4 and 5, respectively.

Step IV

To set or change the color density for scanners, by way of example, the operator may set the midtones at a dot percentage of 50%, and the shadow tones at a dot percentage of 80%, this being roughly equivalent to the percentage of color in the respective areas involved in an equivalent printed copy. To make the settings, the operator determines an area on the color transparency 28 which is representative of a midtone (50% dot size) for each primary color component, then analyzes and inputs this information into the color scanner to establish a 50% dot percentage control point for that area and similar areas where the light intensity in that particular color is of the same density. Likewise, the operator picks an area on the color transparency which is representative of a shadow tone (80% dot size), then analyzes and inputs this information to the scanner in order to produce an 80% dot percentage control point for that area and similar areas where the light intensity in that particular color is of the same density. With these midtone and shadow areas so selected in each color to establish the dot pecentage control points, the dot percentages are then increased or decreased in size as determined from the charts (FIGS. 4 and 5).

Reverting now to the specific example in which the yellow density is to be reduced 0.05 and the magenta density is to be increased 0.18, this is accomplished by changing the dot size at the 50% and 80% levels on FIGS. 4 and 5 as follows.

Referring again to FIG. 4, the color density is plotted along the abscissa, and the dot percentage is plotted along the ordinate. By drawing horizontal lines 72 and 74 from the 50% and 80% dot percentages, corresponding color densities for yellow are found to be 1.24 and 2.04, respectively. Then, by subtracting 0.05 to make the yellow correction, new color densities of 1.19 and 1.99 are determined. Vertical lines 76 and 78 from these new points intersect the yellow curve (FIG. 4) at new points 80 and 82. These new points correspond to 48% and 78% dot percentages, respectively. If the scanner is reprogrammed to change the midtone yellow dot size from 50% to 58% dot percentage, and the shadow dot size from 80% to 78% dot percentage, the desired yellow color will be obtained when the composite color picture is printed.

Referring again to FIG. 5, the same procedure provides new points 84 and 86, which indicate the desired magenta color density. These new points 84 and 86 represent adjusted dot sizes 58% and 84%, respectively. Re-programming the scanner to increase the midtone magenta dot size from 50% to 58% dot percentage, and to increase the shadow dot size from 80% to 84% dot percentage, will result in the desired magenta color in the printed picture.

Because the cyan color in this example is unchanged from normal halftone separation film production, no adjustment need be made in the 50% and 80% dot sizes.

Step V

After altering the yellow and magenta dot sizes as described above, the transparency is scanned. The scanner's computer control makes the appropriate alterations in dot size corresponding to changes in densities of the three primary colors read by the scanner analyze head as the color transparency is scanned. The scanner then generates separate yellow, magenta and cyan halftone separation films 28a, 28b, 28c. Separate color printing plates are then made from the separation films in the customary manner. The end result is a printed reproduction of the original color transparency with the desired color balance which was determined for the original color transparency in Step II, above.

In theory, the just-described process works every time to produce the "perfect" color print with the first set of halftone separation films made. In practice, however, minor adjustments generally are required in setting the halftone dot pecentages in the color scanner. This is due to what is called in the trade ink contamination, meaning that each of the primary colors of printing ink—yellow, magenta and cyan—contains a minor amount of the other two primary colors. The color filters used in current graphic arts and photographic viewing equipment (e.g., the variable color transparency viewer 20 or 20a) are very pure, and therefore alter the original white light beam by imparting pure yellow, magenta and cyan colors to the beam. The precise relationships between the color balance as shown on the transparency viewer cannot, therefore, be translated directly to corresponding color balances (color density ratios) in the application of printing inks.

The amount of contamination in printing inks is not necessarily the same in all printing inks, and does not necessarily vary linearly with the color density for any particular primary color of ink. Typically, cyan printing ink contains a certain amount of magenta and yellow colors. Likewise, magenta printing ink includes a small amount of yellow and cyan colors. The amount of contamination in yellow printing ink is very small and therefore, can be discounted. Therefore, in order to achieve a more exact desired color balance in a printed reproduction, the operator must include the particular ink contamination considerations in his altering of the dot percentages when generating the three color halftone separation films.

Figure 6:
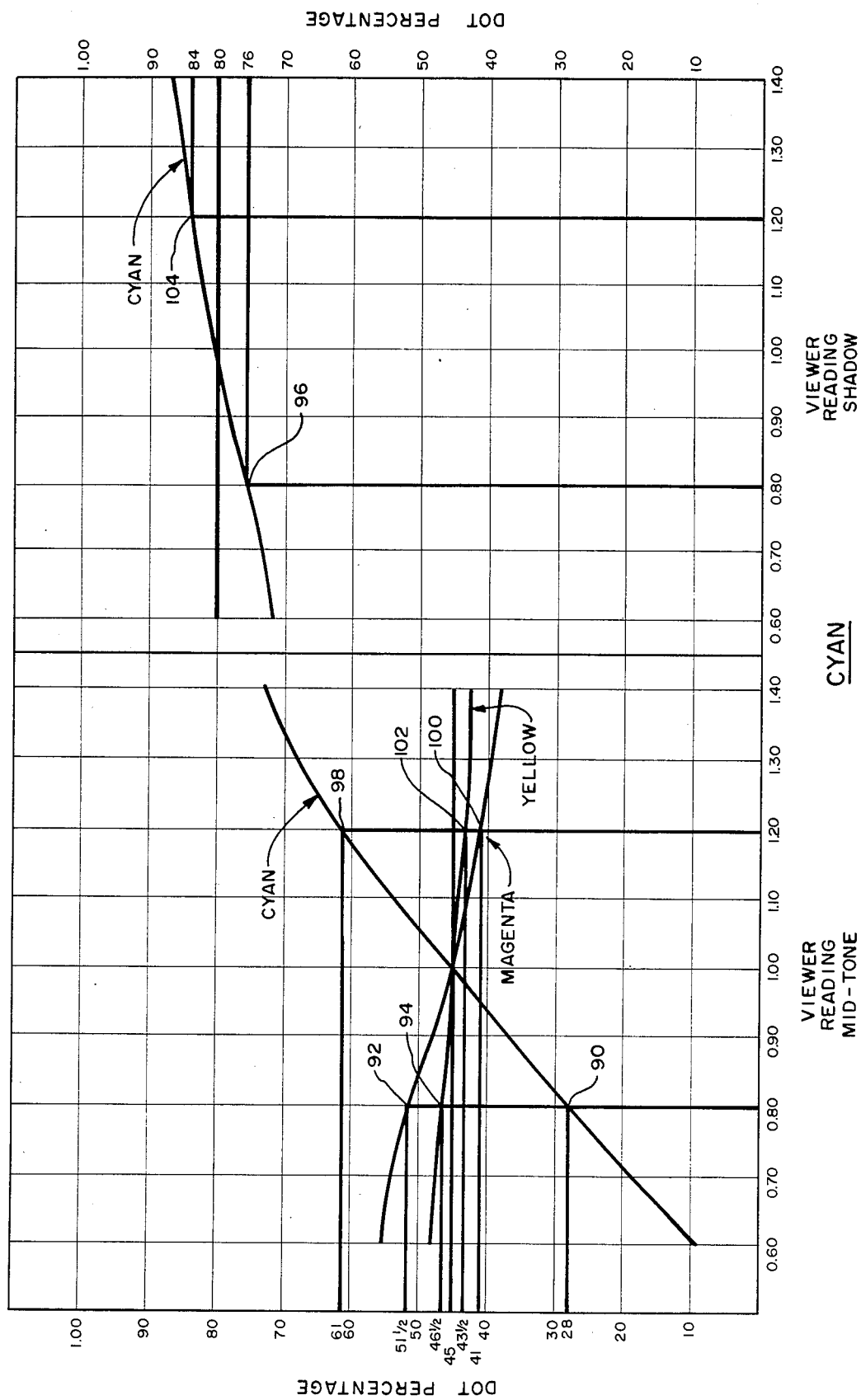
FIG. 6 is a graph showing relative amounts of contamination of yellow and magenta colors in cyan printing inks, as related to the indicator scale readout of a transparency viewer.

Turning now to FIG. 6, and initially to the left side of the graph, the following example will help explain the process for altering the primary color dot percentages to compensate for printing ink contamination. FIG. 6 is a graph showing relative amounts of contamination of yellow and magenta in cyan printing ink, as a function of transparency viewer readout scale in the midtone (here taken at 45% dot size) and shadow (80% dot size) regions. For simplicity, assume that, with the digital readout display on the variable color transparency viewer uniformly adjusted (i.e. the readouts for each color are at 1.00), the original transparency appears to have too much cyan in it; therefore, some of the cyan color should be removed. Adjusting the cyan intensity results in a reading of 0.80 on the cyan readout, while leaving 1.00 on the magenta and yellow readouts. Referring again to FIG. 6, 0.80 on the viewer readout translates to a 28% cyan dot at midtone (45% dot in this example), point 90. By reducing the cyan dot to 28% from the original 45%, due to the ink contamination in cyan, the amount of magenta and yellow in the contaminated cyan ink is also reduced.

Referring again to FIG. 6, it can be seen that the magenta dot size should be increased by approximately 6½% (51½%–45%), and the yellow dot size should be increased by approximately 1½% (46½%–45%) in order to compensate for the decrease in the amount of magenta and yellow in the contaminated cyan printing ink. See points 92 and 94, respectively, on FIG. 6, left side. As a practical matter, because scanners are adjustable only in full percentages, the color contamination correction in magenta and yellow dot size may be adjusted by 7% and 2%, respectively. In other words, by decreasing the cyan intensity (reducing the cyan dot size), we are also slightly reducing the magenta and yellow intensity. Therefore, a slight amount of magenta and yellow intensity should be added (the respective dot sizes increased) in order to compensate for this loss and render the magenta and yellow intensities essentially unaffected. In this particular instance, the proper setting for the cyan, magenta and the yellow dot percentages in the midtone (45% dot) range would be: cyan: 28%; magenta: 52% (45% plus 7%); and yellow: 47% (45% plus 2%). These dot percentage changes are all being read along the 0.80 viewer reading line in the left side of FIG. 6 (the midtone (45% dot)) range.

Next, referring to the right side of FIG. 6, it can be seen that the 0.80 on the viewer cyan intensity scale in the shadow (80% dot) range corresponds to 76% dot size, at point 96. Therefore, the operator would reduce the cyan shadow dot size from 80% to the altered 76%. In this cyan shadow region (80% dot) yellow and magenta dot size changes are unnecessary.

The same method is to be followed if it is necessary to add color to the transparency viewer screen to get the desired color balance in the transparency. For example, if in the previous example, cyan needed to be added to the viewer, rather than subtracted, in order to result in the desired color balance in the transparency, the following procedure would be used. Assuming that, in color balance, the viewer intensity readouts were: yellow: 1.00, magenta: 1.00, and cyan: 1.20. In the left side of FIG. 6, a viewer cyan intensity reading of 1.20 corresponds to a 61% cyan dot size (see point 98). Likewise, the viewer 1.20 cyan intensity reading corresponds to a 41% magenta dot size (point 100) and a 43½% yellow dot size (point 102). Therefore, in addition to increasing the cyan dot size from 45% to 61%, we would also reduce the magenta dot size from 45% to 41%, and reduce the yellow dot size from 45% to 43% or 44% in order to compensate for the slight addition to the magenta and yellow colors when the cyan dot size is increased.

Likewise, referring again to the right side of FIG. 6, a 1.20 cyan intensity indication on the viewer reading in the shadow (80% dot) area corresponds to an increase to an 84% cyan dot, point 104. Again, in this range, the effect of magenta and yellow contamination in the cyan printing ink is negligable.

Figure 7:
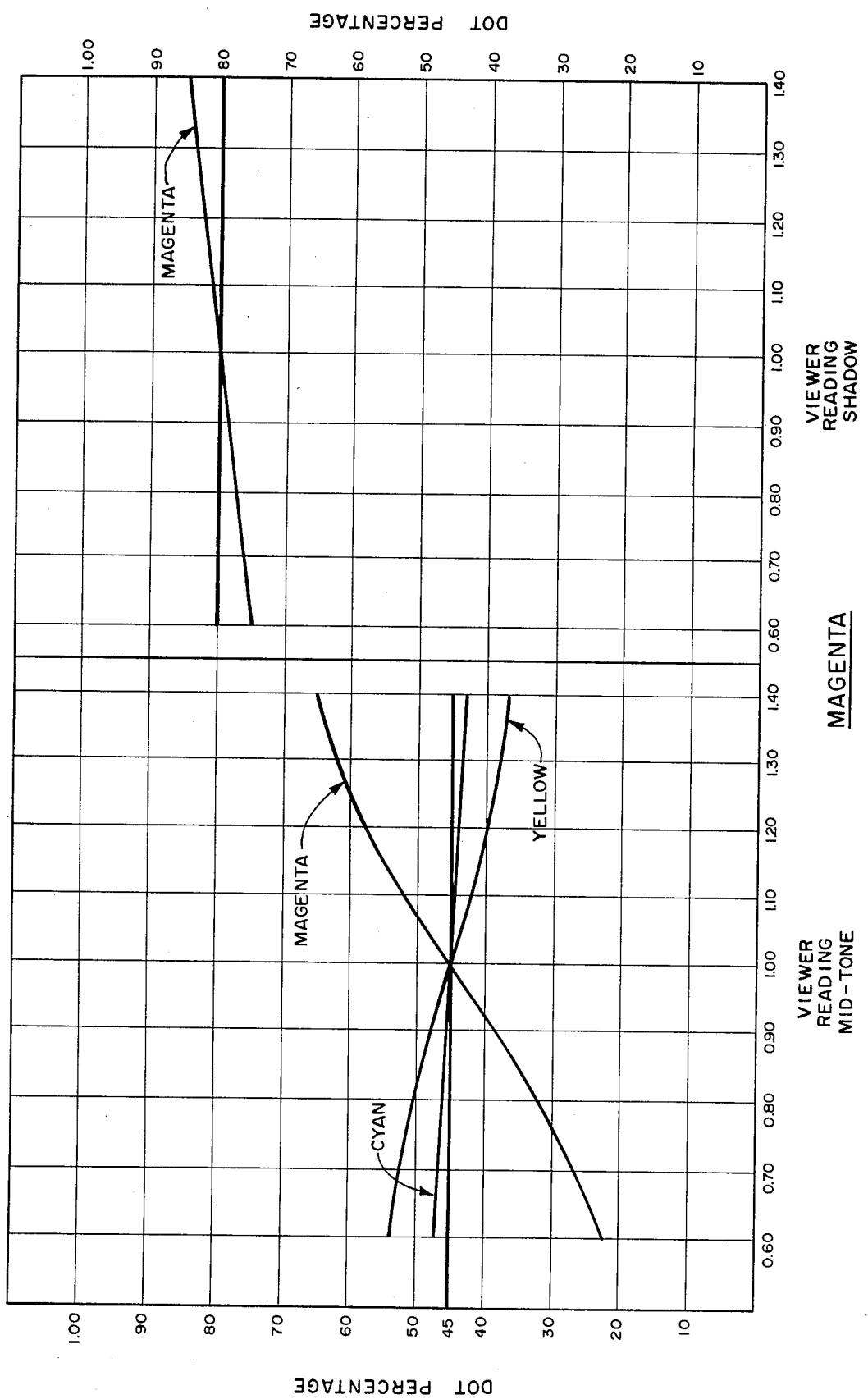
FIG. 7 is a graph similar to FIG. 6, showing relative amounts of contamination of yellow and cyan colors in magenta printing inks, as related to the indicator scale readout of a transparency viewer.

FIG. 7 is comparable to FIG. 6, and shows the yellow and cyan color contamination in magenta printing inks and the alterations in dot sizes necessary in the midtone and shadow regions, as related to magenta color densities as shown on the transparency viewer readout.

Figure 8:
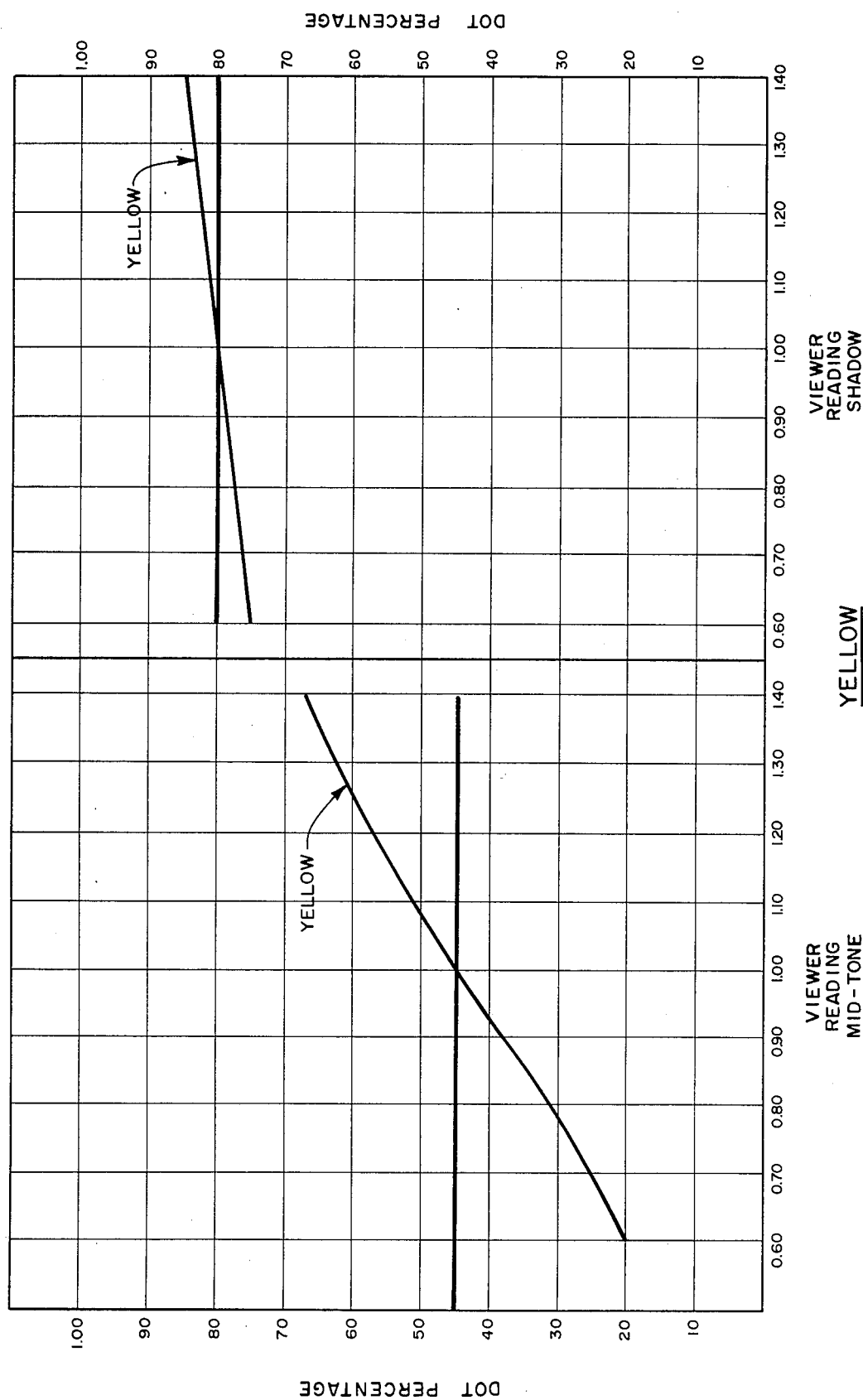
FIG. 8 is a graph similar to FIGS. 6 and 7, showing the relationship between yellow printing ink dot size and yellow density, as indicated on the readout of a transparency viewer.

Because the cyan and magenta color contamination in yellow printing inks is negligible, the contamination amounts do not show on FIG. 8. FIG. 8 does show, however, the relationship between dot size and transparency viewer readout for yellow printing inks in the midtone (45% dot size) and shadow (80% dot size) regions, and can be used along with FIGS. 6 and 7 in accurately determining the correct color dot size adjustment from the viewer readout.

When each of the three primary colors—yellow, magenta and cyan—is altered, especially magenta and cyan, slight adjustments in the dot size of one color will affect the other two. The inventor has determined, however, that once the dot percentage adjustments are effected in accordance with the method of the present invention, any additional effects of ink contamination are only small percentages of small percentages, and are therefore negligible in overall effect.

It is evident that those skilled in the art may make numerous modifications to the method described above without departing from the present inventive concepts. It is accordingly intended that the invention shall be construed as embracing each and every novel feature and novel combination of features present in or possessed by the method herein described and that the foregoing disclosure shall be read as illustrative and not as limiting except to the extent set forth in the claims appended hereto.

The invention having been described, what is claimed is:

1. In a color separation process wherein a color transparency is scanned in order to generate separate yellow, magenta, and cyan halftone color separation films from which separate yellow, magenta, and cyan printing plates are made, said yellow, magenta, and cyan printing plates being used to reproduce said color transparency with yellow, magenta, and cyan printing inks, a method of predictably determining adjusted halftone dot sizes for said halftone color separation films such that said color transparency is reproduced with a desired color balance, said method comprising the steps of:

(a) determining initial relative intensities of yellow, magenta, and cyan components of white light passing through said color transparency when said color transparency is illuminated to have said desired color balance;

(b) determining initial respective dot sizes for each of said yellow, magenta, and cyan halftone color separation films in accordance with respective ones of said initial relative intensities of said yellow, magenta, and cyan components of said white light;

(c) determining amounts of correction to be made to said initial respective dot sizes for each of said yellow, magenta, and cyan halftone color separation films in order to compensate for contamination of said yellow, magenta, and cyan printing inks;

(d) adjusting said initial respective dot sizes for each of said yellow, magenta, and cyan halftone color separation films in accordance with said amounts of correction to be made to said initial respective dot sizes in order to yield respective adjusted dot sizes for each of said yellow, magenta, and cyan halftone color separation films, said respective adjusted dot sizes causing said color transparency to be reproduced with said desired color balance; and (e) generating said separate yellow, magenta, and cyan halftone color separation films in accordance with said respective adjusted dot sizes for each of said yellow, magenta, and cyan halftone color separation films.

2. The method as set forth in claim 1, wherein said relative intensities of said yellow, magenta, and cyan components of said white light passing through said color transparency are correlated with and represented by respective numbers on respective digital displays.

3. The method as set forth in claim 2, wherein the step of adjusting said initial respective dot sizes for each of said yellow, magenta, and cyan halftone color separation films includes the substeps of (d1) translating said amounts of correction to be made to said initial respective dot sizes for each of said yellow, magenta, and cyan halftone color separation films into respective amounts of change in dot sizes for each of said respective yellow, magenta, and cyan halftone color separation films, and (d2) adding or subtracting said respective amounts of change in dot sizes for each of said respective yellow, magenta, and cyan halftone color separation films, as required, to said initial respective dot sizes for each of said yellow, magenta, and cyan halftone color separation films in order to yield said respective adjusted dot sizes for each of said yellow, magenta, and cyan halftone color separation films.

4. In a color separation process wherein a color transparency is scanned in order to generate separate yellow, magenta, and cyan halftone color separation films from which separate yellow, magenta, and cyan printing plates are made, said yellow, magenta, and cyan printing plates being used to reproduce said color transparency with yellow, magenta, and cyan printing inks, a method of adjusting halftone dot sizes for said halftone color separation films in order to compensate for contamination of said yellow, magenta, and cyan printing inks, said method comprising the steps of:

(a) placing said color transparency in a viewing position where it can be viewed by an observer;

(b) back-illuminating said color transparency with a viewing light comprising yellow, magenta, and cyan components, each of said components being adjustable in intensity;

(c) adjusting the intensity of one or more of said yellow, magenta, and cyan components in order to achieve a desired color balance in the appearance of said color transparency;

(d) determining relative values of the intensities of said yellow, magenta, and cyan components when said desired color balance is achieved;

(e) translating said relative values of the intensities of said yellow, magenta, and cyan components into corresponding initial respective dot sizes for each of said yellow, magenta, and cyan halftone color separation films;

(f) determining respective amounts of correction to be made to said initial respective dot sizes for each of said yellow, magenta, and cyan halftone color separation films in order to compensate for said contamination of said yellow, magenta, and cyan printing inks;

(g) adjusting said initial respective dot sizes for each of said yellow, magenta, and cyan halftone color separation films in accordance with said amounts of correction to be made to said initial respective dot sizes in order to yield respective adjusted dot sizes for each of said yellow, magenta, and cyan halftone color seperation films, said respective adjusted dot sizes causing said color transparency to be reproduced with said desired color balance; and (h) scanning said color transparency in order to generate said separate yellow, magenta, and cyan halftone color separation films in accordance with said respective adjusted dot sizes for each of said yellow, magenta, and cyan halftone color separation films.

5. The method as set forth in claim 4, wherein said relative values of the intensities of said yellow, magenta, and cyan components of said viewing light back-illuminating said color transparency are correlated with and represented by respective numbers on respective digital displays.

6. The method as set forth in claim 5, wherein the step of adjusting said initial respective dot sizes for each of said yellow, magenta, and cyan halftone color separation films includes the substeps of (g1) translating said amounts of correction to be made to said initial respective dot sizes for each of said yellow, magenta, and cyan halftone color separation films into respective amounts of change in dot sizes for each of said respective yellow, magenta, and cyan halftone color separation films, and (g2) adding or subtracting said respective amounts of change in dot sizes for each of said respective yellow, magenta, and cyan halftone color separation films, as required, to said initial respective dot sizes for each of said yellow, magenta, and cyan halftone color separation films in order to yield said respective adjusted dot sizes for each of said yellow, magenta, and cyan halftone color separation films.

* * * * *

UNITED STATES PATENT AND TRADEMARK OFFICE
CERTIFICATE OF CORRECTION

PATENT NO. : 4,719,506

DATED : January 12, 1988

INVENTOR(S) : Keith E. Van Buren

It is certified that error appears in the above-identified patent and that said Letters Patent is hereby corrected as shown below:

In the ABSTRACT, line 23, "magenta and cyan" should be --magenta, cyan and black--;

In column 1, line 22, "printing successively" should be --printing involves successively--;

In column 1, line 52, "of" should be --for--; (first occurrence)

In column 3, line 61, "20amay" should be --20a may--;

In column 5, line 13, "proof is printed." should be --color proof is printed.--;

In column 6, line 27, "meant" should be --means--; and

In column 7, line 29, "58%" should be --48%--.

Signed and Sealed this

Twenty-sixth Day of July, 1988

*Attest:*

DONALD J. QUIGG

*Attesting Officer*   *Commissioner of Patents and Trademarks*